US009609566B2

(12) United States Patent
Himayat et al.

(10) Patent No.: US 9,609,566 B2
(45) Date of Patent: Mar. 28, 2017

(54) RADIO RESOURCE CONTROL (RRC) PROTOCOL FOR INTEGRATED WLAN/3GPP RADIO ACCESS TECHNOLOGIES

(71) Applicant: Intel Corporation, Santa Clara, CA (US)

(72) Inventors: Nageen Himayat, Fremont, CA (US); Alexander Sirotkin, Petach Tikva (IL); Jing Zhu, Portland, OR (US); Alexandre Stojanovski, Paris (FR); Mo-han Fong, Sunnyvale, CA (US); Vivek G. Gupta, San Jose, CA (US); Huaning Niu, Milpitas, CA (US); Pingping Zong, Randolph, NJ (US); Konstantinos Dimou, Santa Clara, CA (US); Shu-Ping Yeh, New Taipei (TW); Shilpa Talwar, Los Altos, CA (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 158 days.

(21) Appl. No.: 14/583,222

(22) Filed: Dec. 26, 2014

(65) Prior Publication Data
US 2015/0350988 A1     Dec. 3, 2015

Related U.S. Application Data

(60) Provisional application No. 62/007,388, filed on Jun. 3, 2014.

(51) Int. Cl.
*H04W 36/22*     (2009.01)
*H04W 12/04*     (2009.01)
(Continued)

(52) U.S. Cl.
CPC .......... *H04W 36/22* (2013.01); *H04W 12/04* (2013.01); *H04W 8/24* (2013.01);
(Continued)

(58) Field of Classification Search
CPC . H04W 36/22; H04W 36/14; H04W 36/0072; H04W 36/0083; H04W 12/04; H04W 8/24; H04W 84/12; H04W 88/06
See application file for complete search history.

(56) References Cited

U.S. PATENT DOCUMENTS 8,364,148 B2 *   1/2013   Dravida ............... H04W 60/00
                                                                                            455/41.2
2006/0205444 A1   9/2006   Aerrabotu et al.
(Continued)

FOREIGN PATENT DOCUMENTS

WO    WO 2014-043494 A1    3/2014

OTHER PUBLICATIONS

International Search Report and Written Opinion received in corresponding PCT Application PCT/US2015/028634 dated Aug. 27, 2015.
(Continued)

*Primary Examiner* — Curtis A Alia
(74) *Attorney, Agent, or Firm* — Ledell Ansari, LLP

(57) ABSTRACT

An integrated WLAN/WWAN Radio Access Technology (RAT) architecture is described in which signaling used to control the integration of the WLAN/WWAN architecture is performed over the Radio Resource Control (RRC) plane. The integrated architecture may provide a network-controlled framework for performing traffic steering and radio resource management.

25 Claims, 8 Drawing Sheets

(51) Int. Cl.
   *H04W 84/12*    (2009.01)
   *H04W 8/24*     (2009.01)
   *H04W 36/00*    (2009.01)
   *H04W 36/14*    (2009.01)
   *H04W 88/06*    (2009.01)

(52) U.S. Cl.
   CPC .... *H04W 36/0072* (2013.01); *H04W 36/0083* (2013.01); *H04W 36/14* (2013.01); *H04W 84/12* (2013.01); *H04W 88/06* (2013.01)

(56) References Cited

U.S. PATENT DOCUMENTS

| | | |
|---|---|---|
| 2008/0305825 A1* | 12/2008 | Shaheen ............... H04W 8/24 455/552.1 |
| 2013/0016696 A1 | 1/2013 | Adjakple et al. |
| 2013/0083783 A1 | 4/2013 | Gupta et al. |
| 2013/0242783 A1 | 9/2013 | Horn et al. |

OTHER PUBLICATIONS

3rd Generation Partnership Project, Technical Specification Group Services and System Aspects, Study on S2a Mobility based on GPRS Tunnelling Protocol (GTP) and Wireless Local Area Network (WLAN) access to the Enhanced Packet Core (EPC) network (SaMOG), Stage 2 (Release 12); Sep. 2013; 3GPP TR 23.852.
3rd Generation Partnership Project, Technical Specification Group Radio Access Network, Study on Wireless Local Area Network (WLAN)—3GPP radio interworking (Release 12); Dec. 2013; 3GPP TR 37.834.

* cited by examiner

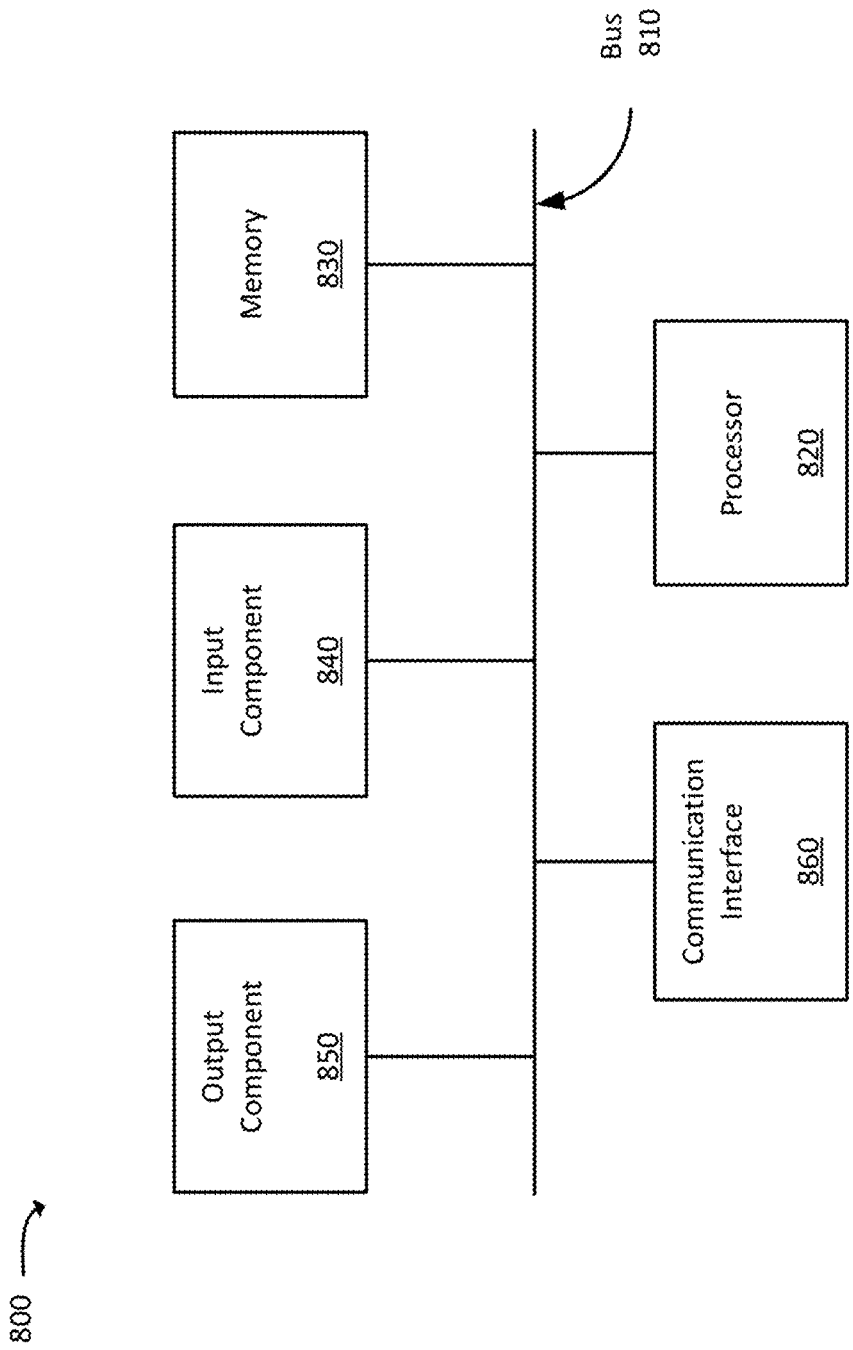

RADIO RESOURCE CONTROL (RRC) PROTOCOL FOR INTEGRATED WLAN/3GPP RADIO ACCESS TECHNOLOGIES

RELATED APPLICATIONS

The present application claims the benefit of U.S. Provisional Patent Application No. 62/007,388, which was filed on Jun. 3, 2014, the contents of which is hereby incorporated by reference as though fully set forth herein.

BACKGROUND

Growth in data traffic driven by smart phone devices, tablets, etc. can strain the capacity of wireless networks. One approach, used by the wireless industry, to address the growth in data traffic has been network densification, wherein small cells are used to increase reuse of licensed spectrum, which continues to be scarce and expensive. Additionally, network operators have also increasingly utilized unlicensed spectrum (e.g., WiFi spectrum) to cope with the increasing capacity demand.

One industry trend facilitating greater cooperation across licensed and unlicensed radio networks is the adoption and deployment of integrated multi-radio small cells with co-located unlicensed (e.g., WiFi) and licensed radio spectrum interfaces. Integrated cells allow for leveraging common infrastructure and site locations, reducing the operational and capital expenditures of network operators. As networks move towards smaller cell sizes, the footprints of cellular and WiFi coverage may increasingly overlap, making such deployments feasible.

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

FIG. 8 is a diagram of example components of a device.

DETAILED DESCRIPTION OF PREFERRED EMBODIMENTS

Figure 1:
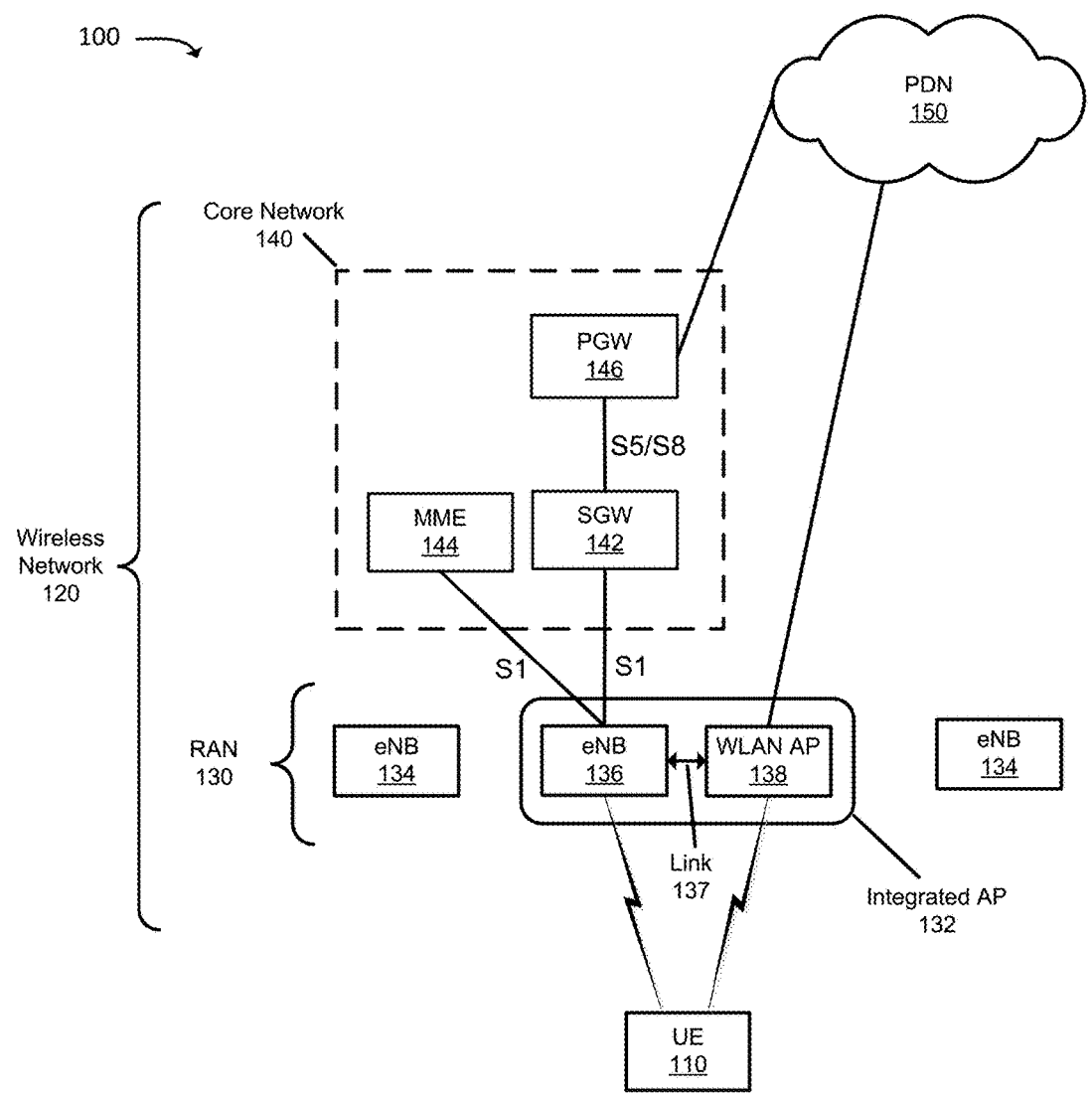
FIG. 1 is a diagram of an example environment in which systems and/or methods described herein may be implemented.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

As used herein, a "wireless local area network (WLAN)" may refer to a wireless computer network that links two or more devices using a wireless distribution method that includes relatively short ranges. A WLAN may be used to create wireless networks within a limited area such as a home or office building. One example of a radio technology that may be used to implement a WLAN is WiFi (i.e., using Institute of Electrical and Electronics Engineers' (IEEE) 802.11-based standards). WLANs are typically implemented using unlicensed radio spectrum (i.e., radio frequencies that can be used without a license from a controlling government entity). In contrast to WLANs, "wireless wide area networks (WWANs)," as used herein, may refer to networks that provide wireless access over larger areas. One example of a WWAN is a cellular network implemented using licensed radio spectrum. From the user's perspective, the WWAN coverage may be provided seamlessly over a number of cells, in the cellular network, to potentially create a large area of uninterrupted network coverage. One example of a WWAN is a cellular radio network based on 3rd Generation Partnership Project (3GPP) Long Term Evolution (LTE) standards.

An integrated WLAN/WWAN Radio Access Technology (RAT) architecture is described herein. The integrated architecture may allow for relatively tight coupling between the WLAN and WWAN radio networks and for Radio Access Networks (RANs) in which simultaneous use of radio resources between the two RATs is employed. The architecture also allows for exploiting the reliability and the wide coverage of the WWAN to improve user experience over unlicensed spectrum. The WWAN link (e.g., the 3GPP LTE link) may be used as a control and mobility anchor for the WiFi radios in unlicensed spectrum, facilitating seamless inclusion of WiFi as a "virtual" or "extension" carrier in the 3GPP operator's RAN. With the integrated architecture, data may be offloaded from the WWAN to the WLAN but still controlled via the WWAN.

Consistent with concepts described herein, an RRC (Radio Resource Control) plane signaling protocol may be used to support an integrated WWAN/WLAN RAT. The RRC control plane protocol may allow the WLAN and WWAN user plane to be coupled at or above the MAC layer and may leverage the existing WWAN carrier aggregation framework. The WWAN/WLAN RAT architecture may include a network controlled framework (potentially using information from mobile devices to assist in the control) for traffic steering and performing radio resource management.

In one implementation described herein, RAN-anchored Layer 2 integration of WiFi (WLAN) and Long Term Evolution (LTE) 3GPP radio interfaces (WWAN) is based on LTE control of the end-to-end service, session setup, and bearer mobility. The WiFi RAT may be operated as a secondary carrier ("SCell") for data offload under LTE control, and the LTE RAT may serve as the primary carrier ("PCell"). A mobile device may be in connected mode on the LTE link regardless of whether traffic is routed across the WLAN or the LTE link. The WLAN carrier may be coupled above the MAC layer.

In one implementation, UE may include a wireless wide area network (WWAN) component to connect to a wireless network using licensed frequency spectrum; a wireless local area network (WLAN) component to connect to a wireless access point (AP) using unlicensed frequency spectrum; and processing circuitry to: receive, from the WWAN component and via a radio resource control (RRC) layer, information identifying carriers associated with the wireless AP; and receive, from the WWAN component and via the RRC layer, an indication to connect to the wireless AP using one of the identified carriers, the indication to connect to the wireless AP including at least a WLAN AP identifier and a WLAN security key; and connect to the wireless AP, based on the received WLAN AP identifier and the WLAN security key, to establish a bearer channel over which data is offloaded from the WWAN to the WLAN.

Additionally, the processing circuitry may be further to: receive, via the WWAN and as part of an RRC UE Capability Enquiry message, a query for capabilities of the WLAN component. Additionally, in in response to the RRC UE Capability Enquiry message, the processing circuitry may transmit an indication of a media access control (MAC) address associated with the WLAN and one or more of: information regarding carrier frequency support provided by the UE; a number of channels associated with the WLAN component; information regarding capability of the UE with respect to Multiple-input and Multiple-output (MIMO) of the WLAN component; or an indication of whether the UE supports an integrated WLAN carrier.

Additionally, the processing circuitry may be further to: receive, from the WWAN component and via the RRC layer, a request for a measurement report, relating to the connection to the wireless AP; and transmit, to the WLAN and via the RRC layer, one or more measured metrics relating to the connection to the wireless AP. Additionally, the one or more measured metrics include one or more of: a Received Signal Strength Indication (RSSI), Received Channel Power Indicator (RCPI), or Received Signal-to-Noise Indicator (RSNI), associated with the connection to the wireless AP; error statistics associated with the connection to the wireless AP; throughput measurements associated with the connection to the wireless AP; access delay measurements associated with the connection to the wireless AP; or interference statistics associated with the connection to the wireless AP.

Additionally, the processing circuitry may be further to: receive, from the WWAN component and via the RRC layer, an RRC Connection Reconfiguration message that includes at least one parameter relating to a dedicated radio bearer; and create, based on the received at least one parameter, the dedicated radio bearer, over the connection with the wireless AP. The at least one parameter may include a media access control (MAC) identifier; a WLAN Quality of Service (QoS) access class; or a probability value relating to a probability that a particular bearer will be allowed to access the WLAN link. Additionally, the processing circuitry may be further to: establish a signaling bearer, over the WLAN, to carry RRC signaling information.

In some implementations, a method may include receiving, by UE and from a base station, a first RRC layer message indicating that the UE should connect to a wireless AP, the RRC layer message including an AP identifier to which the UE should connect; connecting, by the UE, to the wireless AP, based on the AP identifier; receiving, by the UE and from the base station, a second RRC layer message that includes at least one parameter relating to a dedicated radio bearer; creating, based on the received at least one parameter, the dedicated radio bearer, over the connection with the wireless AP; and using the dedicated radio bearer, over the connection with the wireless AP, to offload data from a WWAN associated with the base station.

Additionally, the first RRC layer message includes security keys associated with the wireless AP. The first and second RRC layer messages include RRC Connection Reconfiguration messages. Additionally, the method may further include receiving, from the base station and as part of a RRC UE Capability Enquiry message, a query for capabilities of the UE with respect to an ability of the UE to communicate with WLANs. Additionally, the method may further include responding to the RRC UE Capability Enquiry message by transmitting, to the base station, an indication of a MAC address associated with the WLAN access circuitry associated with the UE.

In some implementations, a device may include means for receiving, from a base station, a first RRC layer message indicating that UE should connect to a wireless AP, the RRC layer message including an AP identifier to which the UE should connect; means for connecting to the wireless AP, based on the AP identifier; means for receiving from the base station, a second RRC layer message that includes at least one parameter relating to a dedicated radio bearer; means for creating, based on the received at least one parameter, the dedicated radio bearer, over the connection with the wireless AP; and means for using the dedicated radio bearer, over the connection with the wireless AP, to offload data from a WWAN associated with the base station.

In some implementations, an integrated access point may include a WLAN access point; and an eNB that provides an air interface for an Evolved Packet Core (EPC) network, the eNB being coupled to the WLAN access point via a low latency link, the eNB including processing circuitry to: determine whether UE, connected to the eNB, is to use the WLAN access point to implement a dedicated radio bearer to offload data traffic from the eNB; transmit one or more RRC Connection Reconfiguration messages to the UE, the one or more RRC Connection Reconfiguration messages including an identifier associated with the WLAN access point and one or more parameters associated with the dedicated radio bearer; transmit, to the WLAN access point and via the link between the WLAN access point and the eNB, the one or more parameters associated with the dedicated radio bearer; and control switching, using RRC layer signaling, between using the dedicated radio bearer, implemented via the WLAN access point, and a dedicated radio bearer implemented via the air interface of the eNB, to transmit data.

FIG. 1 is a diagram of an example environment 100 in which systems and/or methods described herein may be implemented. As illustrated, environment 100 may include user equipment (UE) 110, which may obtain network connectivity from wireless network 120. Although a single UE 110 is shown for simplicity in FIG. 1, in practice, multiple UEs 110 may operate in the context of a wireless network. Wireless network 120 may provide access to one or more external networks, such as packet data network (PDN) 150. The wireless network may include radio access network (RAN) 130 and core network 140. Some or all of RAN 130 may be associated with a network operator that controls or otherwise manages core network 140. Core network 140 may include an Internet Protocol (IP)-based network, such as a System Architecture Evolution (SAE) core network or a General Packet Radio Service (GPRS) core network.

UE 110 may include a portable computing and communication device, such as a personal digital assistant (PDA), a smart phone, a cellular phone, a laptop computer with connectivity to a cellular wireless network, a tablet computer, etc. UE 110 may also include non-portable computing devices, such as desktop computers, consumer or business appliances, or other devices that have the ability to wirelessly connect to RAN 130.

RAN 130 may represent a 3GPP access network that includes one or more access technologies. For example, RAN 130 may include base stations. In the context of an LTE-based access network, base stations may be referred to as an evolved NodeBs (eNBs), and are illustrated as eNBs 134 and 136. Some of the eNBs, such as eNB 136, may be associated with an integrated access point (AP), such as integrated AP 132. Integrated AP 132, in addition to providing functionality associated with a traditional eNB, may also include one or more WLAN (e.g., WiFi) access points (WLAN AP) 138. Integrated AP 132 may provide RAN based coordination and simultaneous use of the radio resources between different RATs (e.g., 3GPP cellular (WWAN) and WiFi (WLAN)).

In some implementations, integrated AP 132 may be implemented such that eNB 136 and AP 138 may be physically co-located as part of an integrated multi-radio small cell. Alternatively or additionally, integrated AP 132 may be implemented such that eNB 136 and AP 138 are physically separated but logically co-located, such as via an external, low-latency standardized or proprietary interface that may be used to connect eNB 136 with AP 138. In either case, link 137, which may include a proprietary or other type of low-latency interface, may be implemented between eNB 136 and AP 138. The coverage ranges of eNB 136 and AP 138 may be different and may or may not overlap.

Core network 140 may include an IP-based network. In the 3GPP network architecture, core network 140 may include an Evolved Packet Core (EPC). As illustrated, core network 140 may include serving gateway (SGW) 142, Mobility Management Entity (MME) 144, and packet data network gateway (PGW) 146. Although certain network devices are illustrated in environment 100 as being part of RAN 130 and core network 140, whether a network device is labeled as being in the "RAN" or the "core network" of environment 100 may be an arbitrary decision that may not affect the operation of wireless network 120.

SGW 142 may include one or more network devices that aggregate traffic received from one or more eNBs 134/136. SGW 142 may generally handle user (data) plane traffic. MME 144 may include one or more computation and communication devices that perform operations to register UE 110 with core network 140, establish bearer channels associated with a session with UE 110, hand off UE 110 from one eNodeB to another, and/or perform other operations. MME 144 may generally handle control plane traffic. SGW 142 may include one or more network devices that aggregate traffic received from one or more eNodeBs 132. SGW 142 may generally handle user (data) plane traffic.

PGW 146 may include one or more devices that act as the point of interconnect between core network 140 and external IP networks, such as PDN 150, and/or operator IP services. PGW 146 may route packets to and from the access networks and the external IP networks.

PDN 150 may each include packet-based networks. PDN 150 may include external networks, such as a public network (e.g., the Internet) or proprietary networks that provide services that are provided by the operator of core network 140 (e.g., IP multimedia (IMS)-based services, transparent end-to-end packet-switched streaming services (PSSs), or other services).

A number of communication interfaces, between various devices, are labeled in FIG. 1. The labeled communication interfaces may represent various protocols that are used to communicate between the various devices illustrated in FIG. 1. For example, eNBs 134 and 136 may communicate with SGW 142 using the 3rd Generation Partnership Project (3GPP) standardized S1 interface, and SGW 142 may communicate with PGW 146 using the 3GPP standardized S5/S8 interface.

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Alternatively, or additionally, one or more of the devices of environment 100 may perform one or more functions described as being performed by another one or more of the devices of environment 100.

Figure 2:
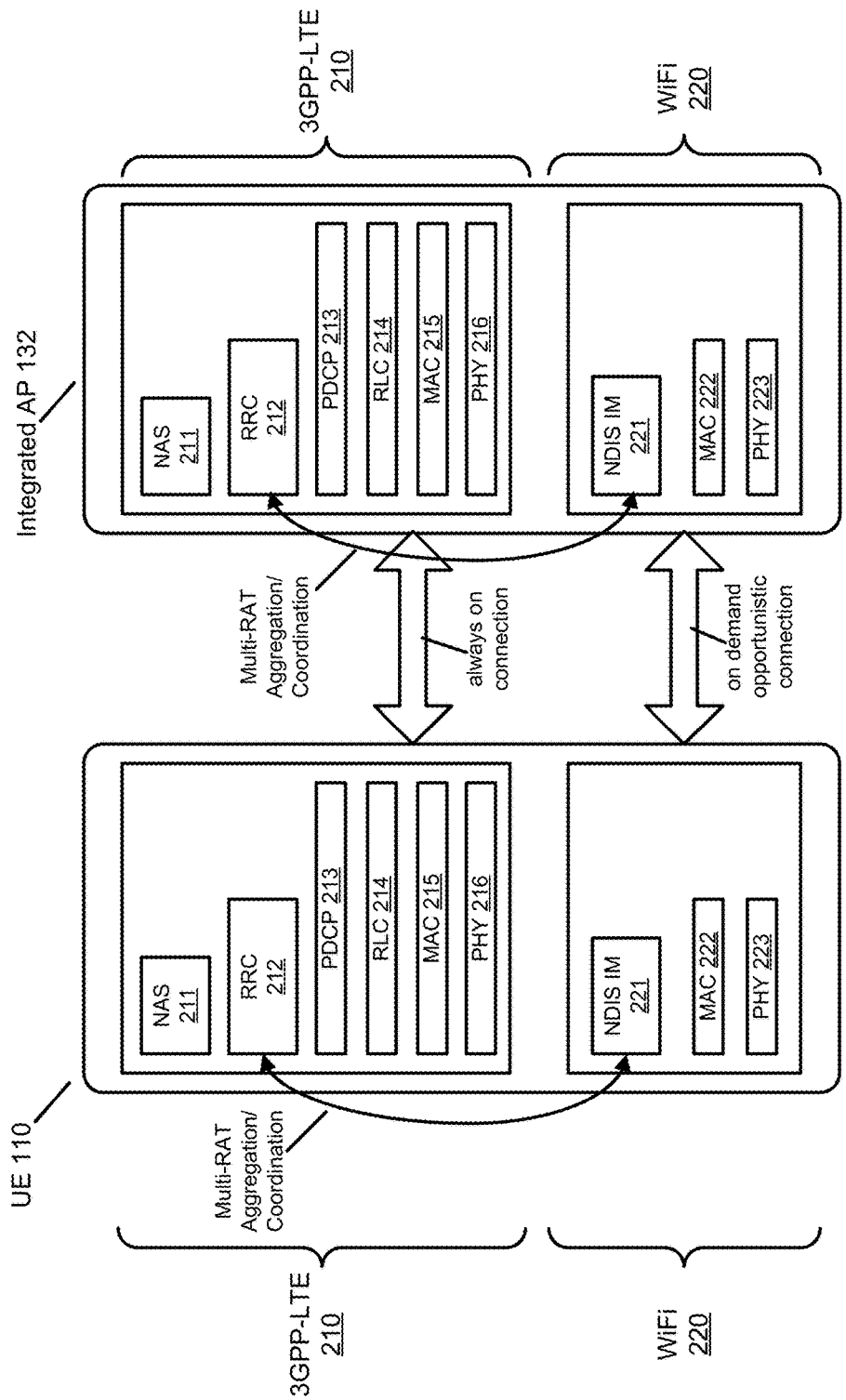
FIG. 2 is a diagram conceptually illustrating an example of various protocol layers, and the interaction of the protocol layers.

FIG. 2 is a diagram conceptually illustrating an example of various protocol layers, and the interaction of the protocol layers, in UE 110 and integrated AP 132. As previously discussed, UE 110 and integrated AP 132 may be devices that include multiple RATs (i.e., multi-mode radio devices), such as devices that include WWAN and WLAN RATs. In the implementations described below, UE 110 and integrated AP 132 will be particularly described as including 3GPP-LTE and WiFi RATs. In other implementations, other possible RATs could be used.

As illustrated in FIG. 2, UE 110 may include 3GPP-LTE component 210 and WiFi component 220. The protocol stack for 3GPP-LTE component 210 of UE 110 may include: Non-Access Stratum (NAS) layer 211, Radio Resource Control (RRC) layer 212, Packet Data Convergence Protocol (PDCP) layer 213, radio link control (RLC) layer 214, media access control (MAC) layer 215, and physical (PHY) layer 216. The protocol stack for WiFi component 220 of UE 110 may include: Network Driver Interface Specification (NDIS) intermedia (IM) layer 221, MAC layer 222, and PHY layer 223. The 3GPP-LTE RAT and WiFi RAT of integrated AP 132 may include protocol layers that correspond to the protocol layers of UE 110.

Referring to 3GPP-LTE component 210, NAS layer 211 may represent the highest stratum of the control plane at the radio interface. An example of the functions performed by NAS layer 211 may include mobility support for UE 110 and support of session management procedures to establish and maintain IP connectivity between UE 110 and PGW 146. RRC layer 212 may perform control functions relating to the LTE air interface control plane. An example of the functions performed by RRC layer 212 may include: broadcasting of system information related to the NAS, broadcasting of system information related to the access stratum (AS), paging, security functions, mobility functions, and Quality of Service (QoS) functions.

PDCP layer 213 may perform functions including, for example, header compression and decompression of IP data, transfer of data (user plane or control plane), maintenance of PDCP sequence numbers (SNs), and/or one or more other functions related to the PDCP layer. RLC layer 214 may perform functions, relating to the LTE air interface control and user planes, such as transfer of upper layer packet data units, error correction, and in-sequence delivery of upper layer packet data units. MAC layer 215 may provide an interface to the network physical layer and may provide services such as channel access control services. PHY layer 216 may implement the basic networking hardware transmission technologies for 3GGP-LTE component 210.

Referring to WiFi component 220, NDIS IM layer 221 may represent an application programming interface (API) for network interface devices. NDIS IM layer 221 may form the logical link control sublayer and may act as an interface to MAC layer 222. PHY layer 223 may implement the basic networking hardware transmission technologies for WiFi component 220.

In operation, 3GPP-LTE component 210 may maintain a connection with eNB 136 of integrated AP 132 (or with other eNBs). The connection may be an "always on" (or typically on) connection that corresponds to PCell connections for UE 110. WiFi component 220 may maintain "on demand" opportunistic connections with AP 138 of integrated AP 132. The on demand connections may correspond to SCell connections for UE 110. Control information relating to the on demand connections may be transmitted, to UE 110, via the PCell. In this manner, the 3GPP-LTE RAN may serve as a control and mobility anchor for WiFi WLANs. The WLAN may effectively be treated as a secondary carrier (layer 2 data pipe) for the primary carrier corresponding to the 3GPP network.

As is further illustrated in FIG. 2, signaling via RRC layers 212 ("Multi-RAT Aggregation/Coordination") may be used to coordinate the integration of the primary and secondary carriers. For example, RRC layer 212 may communicate with NDIS IM layer 221, or with other layers of WiFi 220, to support the integration of the primary and secondary carriers. In integrated AP 132, the multi-RAT aggregation/coordination link may correspond to link 137 (FIG. 1).

In order to effectively implement signaling via RRC layers 212 in order to coordinate the integration of the primary and secondary carriers, RRC signaling modifications, relative to existing RRC implementations, may be implemented with respect to the following functional areas:
 (1) Integrated WLAN Advertisement and Discovery;
 (2) Exchange of UE WLAN Capabilities;
 (3) PCell Default Bearer Setup and WLAN Measurement and Reporting;
 (4) Configuration of the SCell, Including Authentication and Association;
 (5) Session Establishment over WLAN;
 (6) Network Controlled Bearer Switching; and
 (7) Mobility of Radio Bearers.
This list of functional areas, when being discussed below, will be referred to as "items" from the list (e.g., item 1 refers to "Integrated WLAN Advertisement and Discovery").

Regarding integrated WLAN advertisement and discovery (item 1), in one implementation, a UE in idle mode that is performing cell selection/reselection may select an eNB, such as eNB 136 of integrated AP 132, according to existing E-UTRAN association and cell selection procedures, such as procedures based on 3GPP link quality. That is, cell selection may involve selecting the primary LTE carrier (PCell) for operation.

After PCell selection, discovery of SCells may be performed using dedicated signaling over the PCell. The dedicated signaling may indicate the availability of WLAN APs that are operating as part of an integrated AP. In this manner, advertising of secondary WLAN APs, such as advertisement through broadcast system information signaling, may not be needed.

In some implementations, eNB 136 may advertise the capability of the eNB to support secondary WLAN carriers. UE 110 may use such knowledge in deciding whether to select a particular eNB for "camping" during idle mode operation of UE 110. For example, an eNB that supports secondary WLAN carriers may be weighted to be more likely to be used by the UE. One possible cell selection/reselection decision criteria that may be used by UE 110 may be: select the best LTE cell (as determined by Reference Signal Received Power (RSRP) and/or Reference Signal Received Quality (RSRQ)) which contains secondary WLAN carriers, as long as the signal quality of the LTE cell (e.g., as determined by RSRP or RSRQ) is above a certain threshold.

In some implementations, the indication of whether an eNB is associated with an integrated AP may be performed via a system information broadcast message. For example, a Boolean field (e.g., the Boolean field "WLANCapable") may be added to the 3GPP "System Information Block Type 1" (SIB1) broadcast to indicate an eNB is associated with SCells.

Alternatively or additionally, in some implementations, eNB 136, of integrated AP 132, may advertise whether the corresponding WLAN AP (AP 138) is capable of Non-Seamless WLAN Offload (NSWO). The advertisement can be added as a Boolean field (e.g., the Boolean field "WlanNSWOCapable") to the SIB1 broadcast or to other SIBs. Alternatively or additionally, in some implementation, the advertisement may performed via one or more messages received from the 3GPP Access Network Discovery and Selection Function (ANDSF) component.

In some situations, AP 138 may be configured for independent (non-integrated) operation with eNB 136. In this situation, eNB 136 may indicate the non-integrated state of AP 138 to UE 110. The exact decision to operate the system in an integrated or non-integrated mode may depend on several factors. For example, the number of dual mode UEs connected with the eNB, UE preferences for integrated mode operation, operator policies on the usage of co-located WLAN APs and/or on the usage and load of neighboring of WLAN APs.

Regarding the exchange of UE WLAN capabilities (item 2), in order for integrated AP 132 to be able to effectively use WLAN capabilities of UE 110, it may be desirable for eNB 136 to be able to query UE 110 to obtain an indication of the WLAN capabilities of UE 110. For example, it may be desirable for eNB 136 to determine whether UE 110 has available WiFi resources, WiFi protocols that are supported by UE 110, etc. The WLAN capabilities of UE 110 may be obtained via the primary carrier (i.e., via the PCell maintained through the LTE connection).

In one implementation, eNB 136 may query UE 110 for the WLAN capabilities of UE 110 after RRC connection establishment and set up of a signaling resource bearer (e.g., the bearer "SRB1"). The query can also be made after the establishment of default bearers on an as needed basis and may be made depending on several factors, such as, for example, network load conditions, a speed at which the UE is moving, or battery life of the UE. Alternatively or additionally, UE 110 may report the WLAN capabilities, of UE 110, as part of a UE capability reporting that is exchanged during a UE "attach" or "tracking area update (TAU)" procedure.

Figure 3:
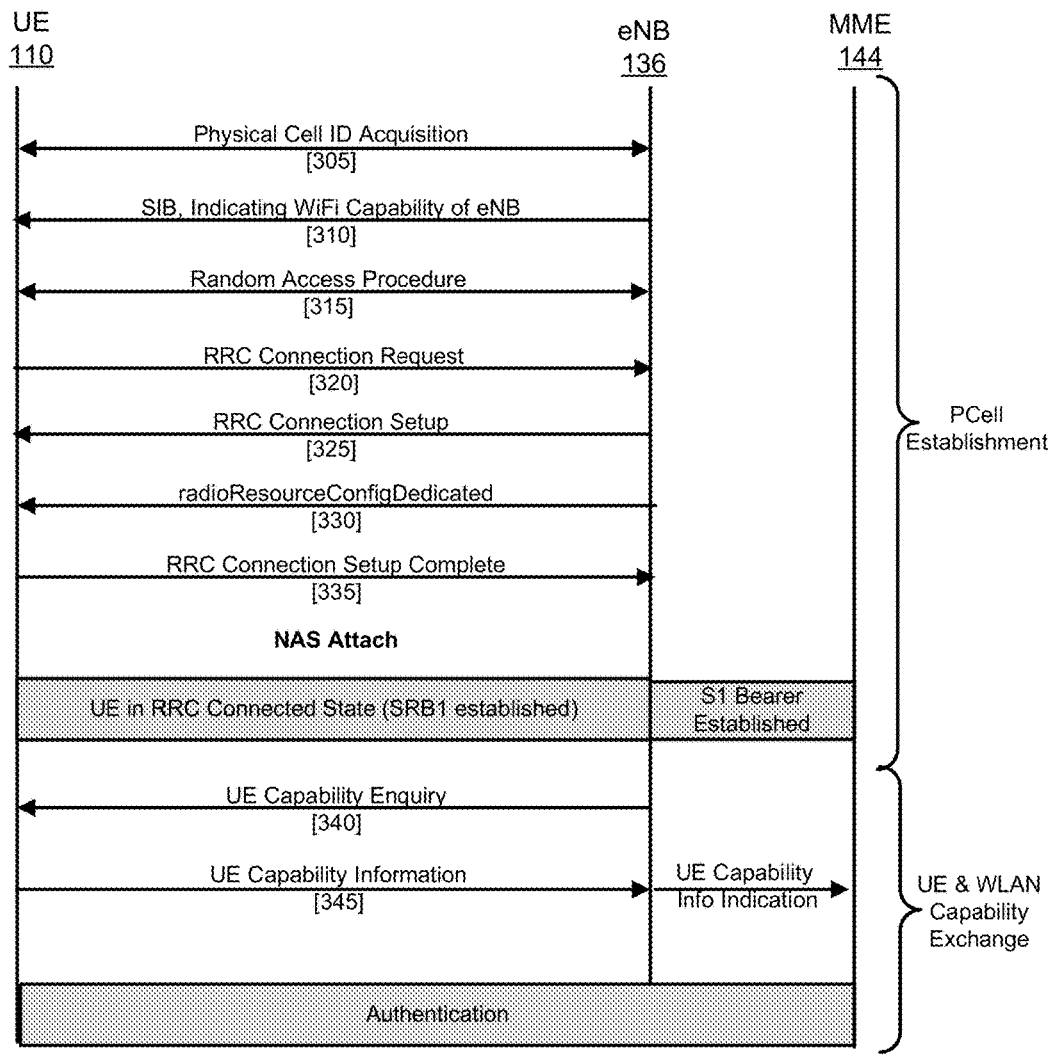
FIG. 3 is a diagram illustrating an example signal flow relating to integrated wireless local area network (WLAN) advertisement and discovery, and the exchange of user equipment WLAN capabilities.

FIG. 3 is a diagram illustrating an example signal flow relating to integrated WLAN advertisement and discovery, and the exchange of UE WLAN capabilities. The signaling shown in FIG. 3 may be performed between UE 110, eNB 136, and MME 144.

As illustrated in FIG. 3, a number of communications, illustrated as communications 305-345, may be involved during establishment of a PCell between UE 110 and eNB 136. In particular, UE 110 may receive an identifier associated with physical cells associated with eNB 136 (at 305, "Physical Cell ID Acquisition"). UE 110 may also receive additional broadcast information from eNB 136, such as a SIB1 broadcast message that may include, among other indications, an indication of whether eNB 136 is part of an integrated AP 132 that is WLAN enabled (at 310, "SIB, Indicating WiFi Capability of eNB"). More generally, the SIB1 broadcast message may include WiFi compatibility information associated with eNB 136 and/or other information regarding associated WLANs or neighboring WLANs.

At some point, UE 110 may establish an RRC connection, via 3GPP-LTE component 210, with eNB 136 (at 315, 320, and 325; "Random Access Procedure," "RRC Connection Request," and "RRC Connection Setup," respectively). As part of the RRC connection setup, eNB 136 may transmit a "radioResourceConfigDedicated" message, which may be used to configure a number of parameters relating to, for example, MAC and PHY layer configurations (at 330, "radioResourceConfigDedicated"). At some point, the RRC connection setup may be complete (at 335, "RRC Connection Setup Complete"). NAS layer attachment may be performed after the RRC connection is complete. Bearers used for signaling, called Signaling Radio Bearers (SRBs), may be established. In particular, the signaling radio bearer "SRB1" may be established. SRB1 may be used for RRC and NAS messages. A bearer may also be established between eNB 136 and MME 144 to implement the S1 interface.

In some implementations, SRB1 may be used to transmit an RRC message that may query UE 110 as to the WLAN capabilities of UE 110. In one implementation, the RRC message "UE Capability Enquiry" may be modified to support identification of WLANs. For example, the UE Capability Enquiry message may include an information element that indicates that a RAT type may be WLAN (e.g., RAT type=WLAN) (at 340, "UE Capability Enquiry (SRB1)"). In one implementation, the UE Capability Enquiry message may be transmitted, by eNB 136, based on the satisfaction of conditions, such as the throughput to UE 110 falling below a threshold and/or the cell load being higher than a threshold.

UE 110 may respond to the capabilities query via an RRC message, such as an RRC message that includes information reporting the WLAN capabilities of UE 110. In one implementation, the RRC message may be an enhanced version of the RRC message "UE Capability Information" in which the enhanced version of the message includes a container information element (IE) that includes the information reporting the WLAN capabilities of UE 110 (at 345, "UE Capability Information"). Non-limiting examples of information that may be included within the container include:

WLAN UE MAC Address;
WLAN air interface support (802.11 version);
Carrier frequency support (e.g. 2.4 or 5 GHz);
Number of channels associated with the UE WLAN;
Multiple-input and Multiple-output (MIMO) capability of the UE;
Support for operation of integrated WLAN carrier;
User preferences relating to operation with a particular WLAN AP in non-integrated mode or operation in integrated mode;
WLAN channel width (e.g. 20 MHz, 40 MHz, 80 MHz);
Maximum supported MCS (maximum coding scheme) index values; and
Other capabilities, e.g., capabilities specified in the Institute of Electrical and Electronics Engineers (IEEE) 802.11 Capability Information field (CIF) and Extended Capabilities element.

In one implementation, the WLAN UE MAC address may be a mandatory element in the container. The MAC address may be used by integrated AP 132, such as by AP 138, to authenticate the UE.

Regarding PCell default bearer setup and WLAN measurement and reporting (item 3), it may be desirable, after a default bearer is setup between eNB 136 and UE 110, for eNB 136 to be able to obtain reports, from UE 110, relating to WLAN(s) to which UE 110 can connect. The reports may include measurement metrics relating to the WLANs (e.g., to the WLAN carriers). A non-limiting list of potential measurement metrics may include:

Received Signal Strength Indication (RSSI)/Received Channel Power Indicator (RCPI)/Received Signal-to-Noise Indicator (RSNI);
Error statistics such as percent missed beacons, Cyclic Redundancy Check (CRC) error statistics, etc.;
Throughput or other quality of service estimates;
Access Delay;
Interference statistics; and
Measurement cycle, such as the cycle at which the RRC may transmit probe packets for QoS estimation.

Figure 4:
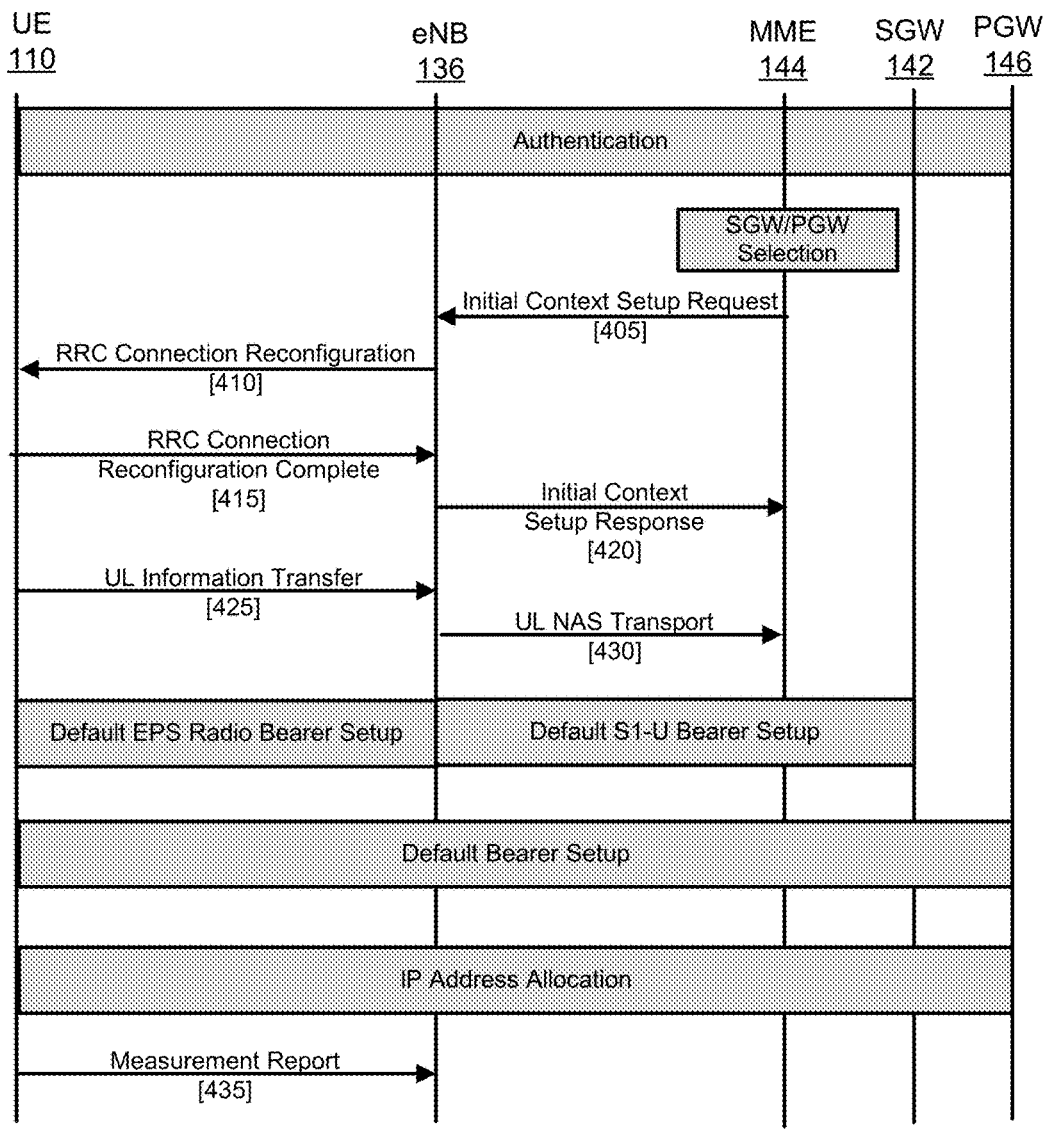
FIG. 4 is a diagram illustrating an example signal flow relating to Primary Cell (PCell) default bearer setup and WLAN measurement and reporting.

FIG. 4 is a diagram illustrating an example signal flow relating to PCell default bearer setup and WLAN measurement and reporting. The signaling shown in FIG. 4 may be performed between UE 110, eNB 136, MME 144, SGW 146, and PGW 146.

As illustrated in FIG. 4, after authentication and SGW/PGW selection, MME 144 may transmit a message that requests the establishment of a context between MME 144 and eNB 136 (at 405, "Initial Context Setup Request"). The message may contain SGW tunneling information. After receiving the Initial Context Setup Request message, eNB 136 may transmit a "RRC Connection Reconfiguration" message (at 410, "RRC Connection Reconfiguration"). The RRC Connection Reconfiguration message, in existing LTE networks, may be used to modify an RRC connection. Consistent with aspects described herein, the RRC Connection Reconfiguration message may be modified to include one or fields through which eNB 136 can schedule WLAN measurement report(s). In one implementation, the RRC Connection Reconfiguration message may include one or more measurement objects (i.e., data structures designed to communicate measurement report requests), wherein each measurement object may correspond to a particular WLAN carrier or multiple WLAN carriers. In one implementation, a measurement object may specify the measurement metrics that are requested by eNB 136.

UE 110 may respond to the RRC Connection Reconfiguration message to indicate when the connection reconfiguration is complete (at 415, "RRC Connection Reconfiguration Complete). Similarly, eNB 136 may respond to MME 144 with respect to the completion state of the Initial Context Setup Request (at 420, "Initial Context Setup Response").

In one implementation, the default EPS bearer may be initially mapped to the WWAN, but can also be configured such that traffic over the default bearer can be carried over both the WLAN and WWAN if needed. The radio configuration for WWAN link may be maintained even if the WLAN link is used to carry the bearer traffic. Accordingly, in one implementation, the RRC Connection Reconfiguration message may also include the information element "Radio Resource Config Dedicated." All fields of this information element (e.g., pdcpConfig, rlcConfig, macConfig, phyConfig, etc.) may be configured.

Optionally, eNB 110 may tear down an unused WWAN link when a session is transferred to WLAN and reestablish the link when the connection is moved back to the WWAN. For example, for user plane offload that is performed below the PDCP layer, the pdcpConfig resources may be retained on the WWAN link when bearer is moved on the WLAN link.

Referring back to FIG. 4, UE 110 may initiate a "UL Information Transfer" (at 425, "UL Information Transfer") to transfer NAS data. eNB 136 may transmit NAS data to MME 144 (at 430, "UL NAS Transport").

As is further illustrated in FIG. 4, a number of setup and allocation procedures may be performed, including setting up the default EPS radio bearer ("Default EPS Radio Bearer Setup"), setting up the default S1-U bearer ("Default S1-U Bearer Setup"), setting up the default EPS bearer ("Default EPS Bearer Setup"), and allocating an IP address to UE 110 ("IP Address Allocation").

UE 110 may transmit, to eNB 136, the measurement report, which includes the measurement metrics (at 435, "Measurement Report"). The measurement report may be reported over SRB1 of the PCell.

WLAN measurements may be requested by eNB 136 at any time during the RRC Connected state. In some implementations, eNB 136 can also configure triggers for measurement reports. For example, an event, such as a RAT neighbor cell signal quality becoming greater than a threshold, may be used. At the detected occurrence of this event, UE 110 may transmit the measurement report. Additional examples of events that may be used include: signal quality of a WLAN AP, that is not being used, becomes better (or better by greater than an offset threshold) than the signal quality of a configured WLAN SCell; or neighbor WLAN AP signal quality becomes better than a threshold and the load on the neighbor WLAN AP is below another threshold.

eNB 136 may determine whether a particular WLAN AP should be used as an SCell for a particular UE. The determination may be made based on, for example, the measurement metrics received by eNB 136, capabilities of the UE, network load, and/or other considerations. Configuration of an SCell, including authentication and association with the SCell (item 4), will next be described in additional detail.

In one implementation, RRC Connection Reconfiguration messages may be used to support WLAN SCells. The RRC Connection Reconfiguration message may be modified to support WLAN SCells by enhancing existing information elements associated with the RRC Connection Reconfiguration message, such as the information element "SCell-ToAddModList10," and/or through the use of a new information element. For example, the new information element may carry a WLAN AP/SCell identifier. The new information element may potentially also include WLAN security keys and/or a WLAN AP virtual MAC (v-MAC) identifier that may be used for tunneling the traffic of the default bearer. The WLAN AP/SCell identifiers may be used, by eNB 136, to identify SCells. A WLAN AP/SCell identifier may map to a corresponding set of WLAN identifiers (e.g., Homogenous Extended Service Set Identifier) (HESSID), Service Set Identifier (SSID), and/or Basic Service Set Identification (BSSID)).

Based on the RRC Connection Reconfiguration message, UE 110 may configure the SCell by connecting to the corresponding AP and initiating association and/or authentication with the AP. Prior to authentication of UE 110 with AP 138, eNB 136 and AP 138 (i.e., the co-located AP) may share identification information for UE 110 and potentially security keys that are to be used for WLAN authentication and encryption over the WLAN link. Similarly, for implementations in which eNB 136 and AP 138 are not physically co-located, eNB 136 and AP 138 may share the identification information using proprietary or standards based signaling, such as using an enhanced version of X2 signaling.

In one implementation, UE 110 may use WPA-PSK keys for authentication/encryption over the WLAN link. Alternatively, LTE encryption keys may be reused for encryption of the WLAN link. If WLAN keys, such as WPA-PSK, are used, eNB 110 may generate such keys or use keys available at the WLAN AP (e.g., via configuration from an Authentication, Authorization, and Accounting (AAA) server). In some implementations, eNB 136 and AP 138 may share such keys via link 137. eNB 136 and the AP 138 may also share the v-MAC identifier, which may identify the point to point tunnel associated with of the bearer over the WLAN.

To summarize the above description relating to configuration of an SCell, including authentication and association with the SCell, eNB 136 may notify UE 110 of the WLAN AP Identifiers to be used for the SCell, the WLAN security keys to be used for authentication, and the v-MAC identifier that may be used for tunneling the traffic for the default bearer over the WLAN link. Based on this information, UE 110 may then authenticate and associate with the WLAN AP either by using the security keys obtained from the RRC signaling or via open authentication. AP 138 (i.e., the WLAN AP) may check whether UE 110 is authorized to associate with AP 138. Once UE 110 completes WLAN authentication and association, UE 110 may complete configuration of the SCell using the RRC Connection Reconfiguration Complete message.

Figure 5:
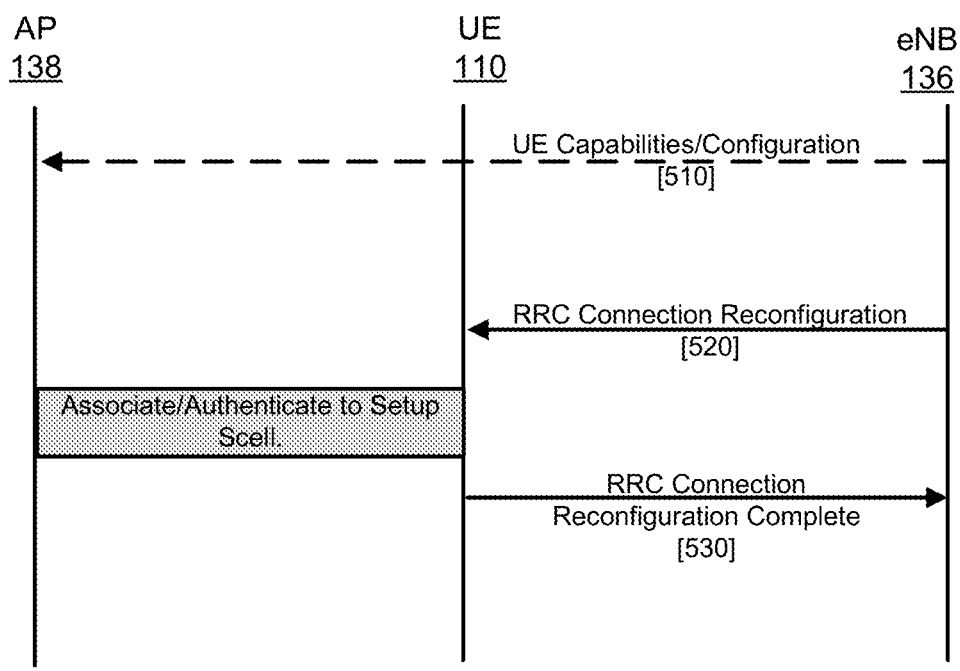
FIG. 5 is a diagram illustrating an example signal flow relating to configuration of a Secondary Cell (SCell)

FIG. 5 is a diagram illustrating an example signal flow relating to configuration of an SCell. The signaling shown in FIG. 5 may be performed between AP 138, UE 110, and eNB 136. AP 138 and eNB 136 may correspond to the co-located WLAN AP and eNB that are included within integrated AP 132.

As illustrated in FIG. 5, eNB 136 and AP 138 may exchange UE capability and/or configuration information (at 510, "UE Capabilities/Configuration"). In one implementation, the information may be exchanged over a proprietary connection, such as link 137. As mentioned, the exchanged information may include WLAN keys and WLAN MAC identifiers.

An RRC Connection Reconfiguration message may be transmitted from eNB 136 to UE 110 in order to instruct or allow UE 110 to implement an SCell using AP 138 (at 520, "RRC Connection Reconfiguration"). The RRC Connection Reconfiguration message may include information elements that include, for example, a WLAN identifier associated with AP 138, WLAN security keys, a v-MAC identifier of a default bearer (and/or the signaling bearer), and/or other WLAN configuration parameters. In some implementations, the RRC Connection Reconfiguration message may include conditional information elements that support conditional based connections to AP 138. For example, the RRC Connection Reconfiguration message may include an indication that UE 110 is connect to AP 138 only if a certain minimum signal power level is received from AP 138.

In response to the RRC Connection Reconfiguration message, UE 110 may setup the SCell by associating and authenticating with AP 138 ("Associate/Authenticate to Setup Scell"). A message may be transmitted from UE 110 to eNB 136 to indicate when UE 110 has associated with AP 138 (at 530, "RRC Connection Reconfiguration Complete").

The RRC Connection Reconfiguration Complete message may potentially include log information relating to the connection with AP 138. At this point, the default bearer for UE 110 may be supported over WLAN, LTE, or both.

In some implementations, more than one SCell may be simultaneously configured. In this situation, the signaling of FIG. 5 may be performed for each SCell. Additionally, in some implementations, eNB 110 may configure a signaling bearer to carry eNB control messages over the WLAN link (described in more detail below). In this situation, UE 110 may identify the signaling bearer via a signaling v-MAC identifier.

After the default EPS bearer is setup, UE 110 may initiate a session for a specific service such as web browsing, streaming video, voice call etc. Depending on the QoS requirements of the service the network may decide to use the default bearer for transport or set up additional radio bearers. The decision to map specific bearers to WLAN (e.g., WiFi) or WWAN (e.g., LTE link) and the decision to switch the WLAN between them may be made at the RRC layer.

In some implementations, signaling radio bearers will be carried across the WWAN (LTE) interfaces. Accordingly, the signaling and processing required for setting up default signaling bearers, as well as signaling radio bearers (SRB0, SRB1, and SRB2) may follow standard LTE procedures. However, in scenarios where all traffic is offloaded to the WLAN, the WWAN link can potentially be in a relatively long Discontinuous Reception (DRX) cycle ("deep sleep state"), and it may be desirable to carry some RRC signaling on the WLAN link. An optional WLAN signaling bearer may be set up for this purpose and a separate v-MAC identifier may be assigned to this bearer.

The default LTE bearer for each PDN to which the UE connects may initially be set up to run over WWAN. The eNB may later offload the default bearer to the WLAN. Additional dedicated bearers can be set up on an as-needed basis for additional traffic sessions and for potential offloading to the WLAN. When an additional dedicated bearer is set up the eNB may make the determination of whether to use a WWAN or WLAN link for that bearer. The RRC layer may perform admission control to ensure QoS requirements may be supported for the bearer, taking into account whether additional WLAN capability is available for assignment. Given the uncontrolled interference conditions on the WLAN interface, the RRC may decide to allow only non-GBR (Guaranteed Bit Rate) bearers on the WLAN link. The network loading conditions may also be used to determine whether GBR bearers may be transferred over the WLAN link. The RRC layer may maintain a mapping of the bearer Quality Class Indicator to the QoS Access classes supported on the WLAN. The bearers may potentially also be split over both the WLAN and WWAN links according to network loading and channel conditions.

Establishing a bearer using WLAN resources may require changes to existing RRC signaling. Modifications to enable bearer session establishment over WLAN resources will be described next (item 5).

Although elements of core network 140 may control the establishment of end-to-end dedicated radio bearers (DRBs), RRC layer 212 may make admission control decisions to check whether the a new bearer should be supported via WLAN resources. For instance, RRC layer 212 may ensure that the RRC Connection Reconfiguration message includes an information element (e.g., called a "WLANConfig" information element herein) that includes information necessary to complete the DRB setup. Example parameters that may be included as part of the WLANConfig information element include:

- A per-bearer v-MAC identifier for PDCP tunneling;
- A probability value relating to the probability with which transmission is allowed to occur on the WLAN link probabilistic assignment may be used to balance WLAN capacity across Downlink and Uplink transmissions. The WLAN transmitter is expected to perform a pre-backoff with the assigned probability before contending for access on the WLAN link);
- WLAN QoS Access Class; and
- Other relevant WLAN parameters that are not already supported over the WLAN link.

The WLANConfig element may be transmitted between eNB 136 and UE 110. The information, corresponding to the WLANConfig element may be correspondingly supplied to AP 138 via link 137.

In some implementations, existing bearers may also be moved between the WWAN and the WLAN. The decision to move a bearer may also be performed, at eNB 136, via the RRC layer. RRC layer 212 may use the RRC Connection Reconfiguration message to indicate the WLAN specific configuration of the bearer. For a bearer that is to be carried over both WLAN and WWAN links, the configuration elements for both interfaces maybe specified by the RRC layer. For instance, eNB 136 may configure resources for both links, even though only one link may be used for transmission at a given time.

Figure 6:
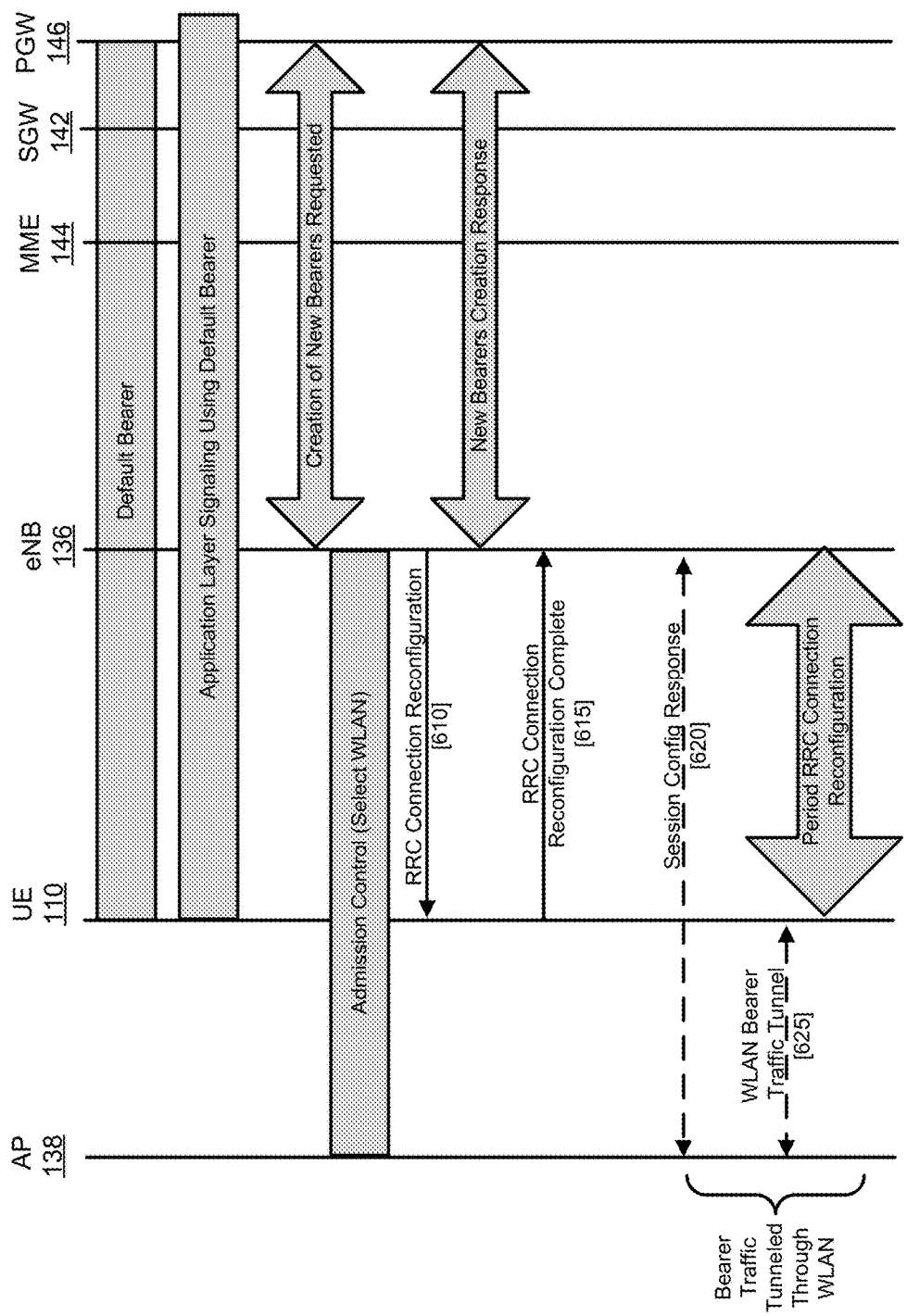
FIG. 6 is a diagram illustrating an example signal flow relating to the establishment of bearer data flows for a SCell.

FIG. 6 is a diagram illustrating an example signal flow relating to the establishment of bearer data flows for a SCell. The signaling shown in FIG. 6 may be performed between AP 138, UE 110, eNB 136, MME 144, SGW 142, and PGW 146. AP 138 and eNB 136 may correspond to the co-located WLAN AP and eNB that are included within integrated AP 132.

As illustrated in FIG. 6, and as previously discussed, a default WWAN bearer may be established ("Default Bearer"). Application layer signaling may be performed over the default bearer ("Application Layer Signaling Using Default Bearer"). As part of the application layer signaling, it may be determined that a new bearer should be created ("Creation of New Bearers Requested"). For example, an application that is executing at UE 110 may begin requesting data streams that core network 140 determines should be handled by an additional bearer(s). At this time or at an early time, and as previously described, one or more WLAN links may be selected ("Admission Control (Select WLAN))."

eNB 136 may determine whether the additional bearer(s) should be established over the WWAN or WLAN. When eNB 136 determines that an additional bearer is to be established over the WLAN, eNB 136 may transmit an RRC Connection Reconfiguration message to UE 110 (at 610, "RRC Connection Reconfiguration"). As mentioned, the RRC Connection Reconfiguration message may include parameters relating to the configuration of the bearer for the WLAN. eNB 136 may respond, such as to PGW 146, to the request to create the new bearers ("New Bearers Creation Response"). UE 110 may also acknowledge the RRC Connection Reconfiguration message (at 615, "RRC Connection Reconfiguration Complete"). Further, eNB 136 may communicate with AP 138, such as over link 137, to provide the WLAN configuration parameters to AP 138 (at 620, "Session Config Response"). At this point, the bearer may be created via the WLAN and bearer traffic may be tunneled through the WLAN (at 625, "WLAN Bearer Traffic Tunnel"). The RRC Connection Reconfiguration message may periodically (or intermittently) be exchanged between eNB 136 and UE 110 to update the parameters relating to the configuration of the bearer(s) for the WLAN ("Periodic RRC Connection Reconfiguration").

A bearer, once established over WLAN, may be switched between the WLAN and WWAN RATs during the course of the session. RRC layer modifications to enable network controlled bearer switching will be described next (item 6).

Once a bearer is established the RRC layer may switch the bearers between WLAN and WWAN during the course of a session. The switching may be implemented using the RRC Connection Reconfiguration message. The RRC layer may maintain the full WWAN RLC, MAC and PHY layer configuration contexts even when the bearer is assigned to WLAN. Maintaining the context may allow for faster setup and switching of connections between WLAN and WWAN. Similarly, the WLAN connection, when the bearer is assigned to the WWAN, may be maintained, but kept in a power savings state.

Figure 7:
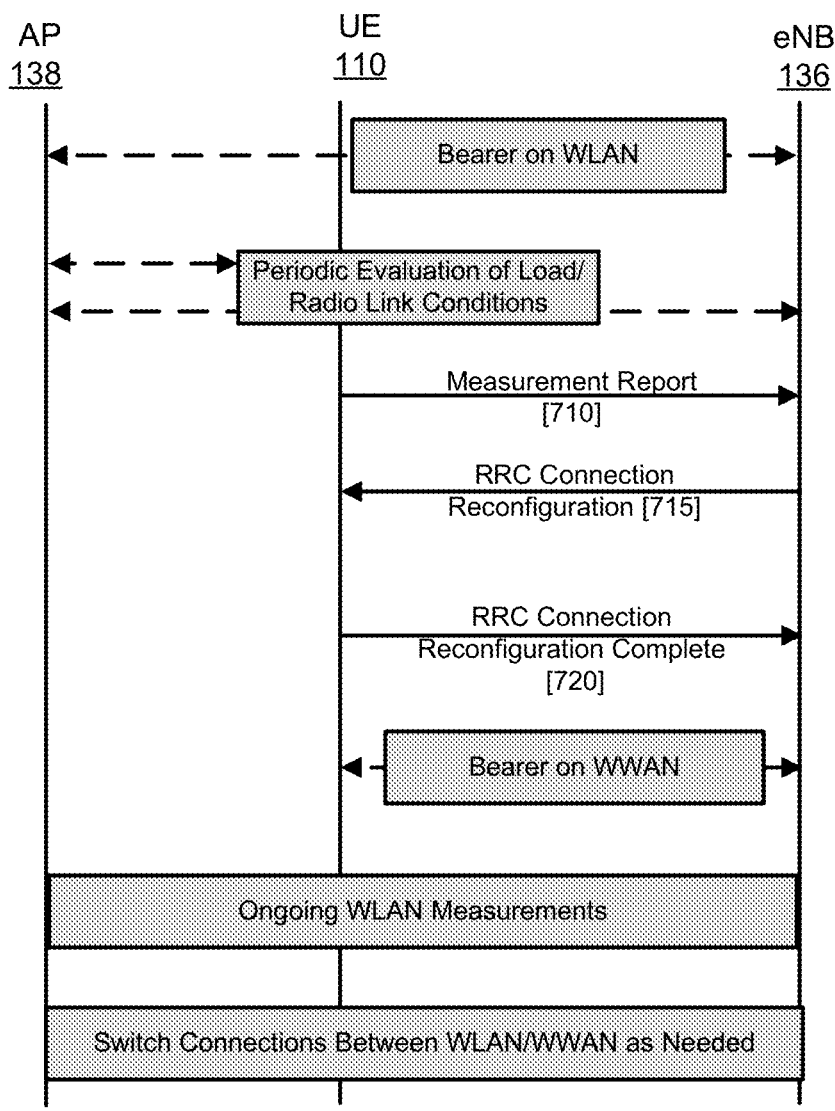
FIG. 7 is a diagram illustrating an example signal flow relating to RRC layer modifications to enable network controlled bearer switching.

FIG. 7 is a diagram illustrating an example signal flow relating to RRC layer modifications to enable network controlled bearer switching. The signaling shown in FIG. 7 may be performed between AP 138, UE 110, and eNB 136. AP 138 and eNB 136 may correspond to the co-located WLAN AP and eNB that are included within integrated AP 132.

As illustrated in FIG. 7, assume a WLAN bearer is established ("Bearer on WLAN"). AP 138 and eNB 136 may exchange, such as via link 137, conditions relating to the WLAN link ("Periodic Evaluation of Load/Radio Link Conditions"). Additionally, UE 110 may transmit a measurement report, as previously discussed, to eNB 136 (at 710, "Measurement Report"). RRC Connection Reconfiguration messages may be exchanged to indicate that the bearer should be switched to WWAN. For example, eNB 136 may determine to switch the bearer to WWAN, and may transmit an RRC Connection Reconfiguration message to indicate the switch to UE 110 (at 715, "RRC Connection Reconfiguration"). UE 110 may acknowledge the message (at 720 "RRC Connection Reconfiguration Complete"). The bearer may then be switched to the WWAN ("Bearer on WWAN"). This process may continue to switch the bearer back and forth between the WWAN and WLAN, as needed ("Ongoing WLAN Measurements" and "Switch Connections Between WLAN/WWAN as Needed").

With respect to the mobility of radio bearer (item 7), when in LTE Connected mode, eNB 136 may use measurements on the PCell to make handoff decisions (i.e., handover processing). For example, good cellular connectivity will be prioritized over the quality of WLAN connectivity. Once the PCell of UE 110 is handed off to a new eNB, the previous eNB may release radio resources inclusive of the WLAN resources. The new eNB may independently decide whether a WLAN secondary carrier should be activated to support the UE that has been handed off. The inter-eNB handoff signaling may exchange context information relating to the WLAN link(s). For example, the context information may include WLAN security context information, and/or other information related to the WLAN, to reduce WLAN authentication time during handoff and/or to augment the WLAN information known by the new eNB.

When UE 110 is in LTE Idle mode, no special treatment for WLAN offloading may be required, as decision to enter Idle mode may be made by eNB 136 based on the "inactivity timer" of UE 110, by MME 144 due to link failure or for security reasons etc., or autonomously by UE 110 autonomously due to radio link failure and subsequent reestablishment failure. eNB 136 may release all E-UTRAN including WLAN resources when UE 110 enters idle mode. Thereafter, UE 110 may use the WWAN link to track pages and perform location updates. eNB 136 may instruct UE 110 to log measurements while in Idle mode, such as by issuing a "Logged Measurement Configuration" command. While in Idle mode, UE 110 may also be instructed to log measurements on the WLAN cell.

FIG. 8 is a diagram of example components of a device 800. Some of the devices illustrated in FIGS. 1 and 2 may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include processing circuitry, such as a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, a WiFi radio, a cellular radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of signals have been described with regard to FIGS. 3-7 the order of the signals may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. User Equipment (UE) comprising:
   a wireless wide area network (WWAN) component to connect to a wireless network using licensed frequency spectrum;
   a wireless local area network (WLAN) component to connect to a wireless access point (AP) using unlicensed frequency spectrum; and
   processing circuitry to:
      receive, from the WWAN component and via a radio resource control (RRC) layer, information identifying carriers associated with the wireless AP; and
      receive, from the WWAN component and via the RRC layer, an indication to connect to the wireless AP using one of the identified carriers, the indication to connect to the wireless AP including at least a WLAN AP identifier and a WLAN security key;
      receive, via the WWAN and as part of an RRC UE Capability Enquiry message, a query for capabilities of the WLAN component;
      transmit, in response to the RRC UE Capability Enquiry message, an indication of a media access control (MAC) address associated with the WLAN and an indication of one or more of:
         information regarding carrier frequency support provided by the UE;
         a number of channels associated with the WLAN component;
         information regarding capability of the UE with respect to Multiple-input and Multiple-output (MIMO) of the WLAN component; or
         whether the UE supports an integrated WLAN carrier; and
      connect to the wireless AP, based on the received WLAN AP identifier and the WLAN security key, to establish a bearer channel over which data is offloaded from the WWAN to the WLAN.

2. The UE of claim 1, wherein the processing circuitry is further to:
   receive, from the WWAN component and via the RRC layer, a request for a measurement report, relating to the connection to the wireless AP; and
   transmit, to the WLAN and via the RRC layer, one or more measured metrics relating to the connection to the wireless AP.

3. The UE of claim 2, wherein the one or more measured metrics include one or more of:
   a Received Signal Strength Indication (RSSI), Received Channel Power Indicator (RCPI), or Received Signal-to-Noise Indicator (RSNI), associated with the connection to the wireless AP;
   error statistics associated with the connection to the wireless AP;
   throughput measurements associated with the connection to the wireless AP;
   access delay measurements associated with the connection to the wireless AP; or
   interference statistics associated with the connection to the wireless AP.

4. The UE of claim 2, wherein the request for the measurement report is included within an RRC Connection Reconfiguration message.

5. The UE of claim 1, wherein the processing circuitry is further to:
   receive, from the WWAN component and via the RRC layer, an RRC Connection Reconfiguration message that includes at least one parameter relating to a dedicated radio bearer; and
   create, based on the received at least one parameter, the dedicated radio bearer, over the connection with the wireless AP.

6. The UE of claim 5, wherein the at least one parameter includes:
   the MAC identifier;
   a WLAN Quality of Service (QoS) access class; or
   a probability value relating to a probability that a particular bearer will be allowed to access the WLAN link.

7. The UE of claim 1, wherein the processing circuitry is further to:
   establish a signaling bearer, over the WLAN, to carry RRC signaling information.

8. The UE of claim 7, wherein the signaling bearer to carry the RRC signaling information over the WLAN is implemented in response to a deep sleep state for the WWAN.

9. A method comprising:
   receiving, by User Equipment (UE) and from a base station, a first radio resource control (RRC) layer message indicating that the UE should connect to a wireless access point (AP), the RRC layer message including an AP identifier to which the UE should connect;

connecting, by the UE, to the wireless AP, based on the AP identifier;
receiving, by the UE and from the base station, a second Radio Resource Control (RRC) layer message that includes at least one parameter relating to a dedicated radio bearer;
creating, based on the received at least one parameter, the dedicated radio bearer, over the connection with the wireless AP;
receiving, from the base station and as part of a RRC UE Capability Enquiry message, a query for capabilities of the UE with respect to an ability of the UE to communicate with wireless local area networks (WLANs);
responding to the RRC UE Capability Enquiry message by transmitting, to the base station, an indication of a media access control (MAC) address associated with the WLAN access circuitry associated with the UE; and
using the dedicated radio bearer, over the connection with the wireless AP, to offload data from a wireless wide area network (WWAN) associated with the base station.

10. The method of claim 9, wherein the first RRC layer message includes security keys associated with the wireless AP.

11. The method of claim 9, wherein the first and second RRC layer messages include RRC Connection Reconfiguration messages.

12. The method of claim 9, further comprising:
switching, in response to one or more RRC Connection Reconfiguration messages received from the base station, between using the dedicated radio bearer over the connection with the wireless AP and between a dedicated radio bearer supported by the base station.

13. The method of claim 9, further comprising:
receiving a request for a measurement report, relating to the connection with the wireless AP; and
transmitting, based on the received request, one or more measured metrics relating to the connection with the wireless AP.

14. The method of claim 13, wherein the one or more measured metrics include at least one of:
a Received Signal Strength Indication (RSSI), Received Channel Power Indicator (RCPI), or Received Signal-to-Noise Indicator (RSNI), associated with the connection with the wireless AP;
error statistics associated with the connection with the wireless AP;
throughput measurements associated with the connection with the wireless AP;
access delay measurements associated with the connection with the wireless AP; or
interference statistics associated with the connection with the wireless AP.

15. The method of claim 13, wherein the request for the measurement report is included within an RRC Connection Reconfiguration message.

16. The method of claim 9, wherein the response to the RRC UE Capability Enquiry message additionally includes one or more of:
information regarding carrier frequency support provided by the UE;
a number of channels associated with the WLAN component;
information regarding capability of the UE with respect to Multiple-input and Multiple-output (MIMO) of the WLAN component; or
an indication of whether the UE supports an integrated WLAN carrier.

17. The method of 9, wherein the at least one parameter includes:
the MAC address;
a WLAN Quality of Service (QoS) access class; or
a probability value relating to a probability that a particular bearer will be allowed to access the WLAN link.

18. The method of claim 9, further comprising:
establishing a signaling bearer, over the WLAN, to carry RRC signaling information.

19. An integrated access point including:
a wireless local area network (WLAN) access point; and
an evolved NodeB (eNB) that provides an air interface for an Evolved Packet Core (EPC) network, the eNB being coupled to the WLAN access point via a low latency link, the eNB including processing circuitry to:
determine whether User Equipment (UE), connected to the eNB, is to use the WLAN access point to implement a dedicated radio bearer to offload data traffic from the eNB;
transmit one or more radio resource control (RRC) Connection Reconfiguration messages to the UE, the one or more RRC Connection Reconfiguration messages including an identifier associated with the WLAN access point and one or more parameters associated with the dedicated radio bearer, wherein the one or more parameters include a virtual media access control (MAC) identifier that is used to implement a tunnel over the WLAN;
transmit, to the WLAN access point and via the link between the WLAN access point and the eNB, the one or more parameters associated with the dedicated radio bearer; and
control switching, using RRC layer signaling, between using the dedicated radio bearer, implemented via the WLAN access point, and a dedicated radio bearer implemented via the air interface of the eNB, to transmit data.

20. The integrated access point of claim 19, wherein the one or more parameters include a WLAN Quality of Service (QoS) access class.

21. The integrated access point of claim 19, wherein the one or more RRC Connection Reconfiguration messages additionally include WLAN security keys.

22. The integrated access point of claim 19, wherein the processing circuitry is further to:
transmit, to the UE, a request for a report relating to the connection of the UE with the WLAN access point; and
receive, based on the request for the report, metrics that include at least one of:
a Received Signal Strength Indication (RSSI), Received Channel Power Indicator (RCPI), or Received Signal-to-Noise Indicator (RSNI), associated with the connection of the UE with the WLAN access point;
error statistics associated with the connection of the UE with the WLAN access point;
throughput measurements associated with the connection of the UE with the WLAN access point;
access delay measurements associated with the connection of the UE with the WLAN access point; or
interference statistics associated with the connection of the UE with the WLAN access point.

23. The integrated access point of claim 19, wherein the link includes a dedicated link between the WLAN access point and the eNB.

24. The integrated access point of claim 19, wherein a handover to and from an integrated eNB is based on measurements on the primary cell, using handover signaling associated with the primary radio access technology (RAT), the eNB further includes processing circuitry to:
  exchange, during a handoff procedure of the UE with another eNB, context information relating to the WLAN access point.

25. The integrated access point of claim 19, wherein the one or more parameters include a probability value relating to a probability that a particular bearer will be allowed to access the WLAN link.

* * * * *